US 6,687,036 B2

(12) United States Patent
Riza

(10) Patent No.: US 6,687,036 B2
(45) Date of Patent: Feb. 3, 2004

(54) MULTIPLEXED OPTICAL SCANNER TECHNOLOGY

(75) Inventor: Nabeel Agha Riza, Oviedo, FL (US)

(73) Assignee: Nuonics, Inc., Orlando, FL (US)

( * ) Notice: Subject to any disclaimer, the term of this patent is extended or adjusted under 35 U.S.C. 154(b) by 0 days.

(21) Appl. No.: 10/011,254

(22) Filed: Nov. 5, 2001

(65) Prior Publication Data

US 2004/0004746 A1 Jan. 8, 2004

Related U.S. Application Data

(60) Provisional application No. 60/245,996, filed on Nov. 3, 2000.

(51) Int. Cl.$^7$ .............................. G02B 26/10; G02F 1/29
(52) U.S. Cl. ....................... 359/204; 359/578; 359/615; 359/298; 250/550; 348/36
(58) Field of Search ............................... 359/578, 579, 359/204, 615

(56) References Cited

U.S. PATENT DOCUMENTS

| | | | | | |
|---|---|---|---|---|---|
| 3,904,981 A | * | 9/1975 | Hughes et al. | ................ | 372/24 |
| 4,250,465 A | * | 2/1981 | Leib | ............................ | 372/24 |
| 4,735,486 A | * | 4/1988 | Leib | ............................ | 359/19 |
| 4,938,550 A | * | 7/1990 | Inagaki et al. | ................ | 359/17 |
| 4,965,441 A | * | 10/1990 | Picard | ...................... | 250/201.3 |
| 5,204,694 A | * | 4/1993 | Andrews | ...................... | 347/256 |
| 5,715,047 A | * | 2/1998 | Adamovsky | ................ | 356/128 |
| 6,118,518 A | * | 9/2000 | Hobbs | ........................ | 356/4.09 |
| 6,134,003 A | * | 10/2000 | Tearney et al. | .............. | 356/450 |
| 6,278,538 B1 | * | 8/2001 | Schleipen | .................... | 359/201 |
| 6,356,342 B1 | * | 3/2002 | Hyldahl et al. | ................ | 355/77 |
| 6,449,047 B1 | * | 9/2002 | Bao et al. | .................... | 356/478 |
| 2003/0004412 A1 | * | 1/2003 | Izatt et al. | ................... | 600/425 |

FOREIGN PATENT DOCUMENTS

EP          0 626 567 A1 *  11/1994

JP          2000-162950 A *  6/2000

OTHER PUBLICATIONS

I. Filinski and T. Skettrup, "Fast Dispersive Beam Deflectors and Modulators", IEEE J. Quantum Elec. vol. QE–18, No. 7, pp. 1059–1062, Jul. 1982.*

N.A. Riza, et al., "High Speed Optical Scanner for Multi–Dimensional Beam Pointing Acquisition", LEOS 1999, IEEE Lasers & Electro–Optics Soc. 12th Annual Meeting, vol. 1, pp. 184–185, San Francisco Nov. 8–11, 1999.*

Zahid Yaqoob, Azhar A. Rizvi, and Nabeel A. Riza; Free–space wavelength–multiplexed optical scanner; Applied Optics/vol. 40, No. 35, Dec. 10, 2001, pp. 1–14.

* cited by examiner

*Primary Examiner*—John Juba
(74) *Attorney, Agent, or Firm*—James H. Beusse; Beusse Brownlee Wolter Mora & Maire, P.A.

(57) ABSTRACT

High speed optical scanner systems and methods using optical multiplexing of wavelengths and spatial codes. In one form, a wavelength multiplexed optical scanner (W-MOS) is disclosed, wherein tuning the wavelength or selection of wavelength accomplishes a high speed, no-moving, parts scanner coupled with a wavelength dispersive element, such as a grating or a thin-film interference filter. In another form, a W-MOS employs beam expansion optics and a freespace-coupled wavelength dispersive element. In another embodiment, the invention includes a fiber-based W-MOS using an optical fiber coupled with a fiber-based wavelength division multiplexer (WDM) device to form a spatially distributed scanner for wide angular coverage in three-dimensional beam scanning. The invention also includes a code multiplexed optical scanner (C-MOS) that uses the principle of holography and spatial code multiple access optical communications. In addition, an optical wireless application is disclosed using the C-MOS's to give fault-tolerance to an indoor wireless network.

10 Claims, 4 Drawing Sheets

MULTIPLEXED OPTICAL SCANNER TECHNOLOGY

SPECIFIC DATA RELATED TO INVENTION

This application claims the benefit of U.S. provisional patent application, Ser. No. 60/245,996, filed Nov. 3, 2000.

FIELD OF THE INVENTION

Applications using scanned or agile laser beams are wide spread in both the commercial and military sectors. First several applications and their scanner requirements are described to put the proposed scanner inventions in perspective.

Military applications such as for infrared countermeasures, target designation, and laser communications presently require substantial improvements in laser beam steering technology. Specifically, there is a need to realize small, low power consumption, lightweight, low cost, rapidly (e.g., a few microseconds or less) reconfigured laser beam scanners for steering, pointing, and tracking. Other useful features of these scanners include the ability to generate multiple simultaneous laser beams in space, eye safe operation, wide scan angles (e.g., ±45 deg.), low sidelobes (e.g., <−30 dB), large apertures (e.g., 10 cm diameter) to provide high resolution scans, and true rapid three dimensional (3-D) beamforming to accurately control beam position, power and shape. This application proposes scanners that can meet the military scanner requirements.

An important commercial application is freespace optical wireless. The need for more information bandwidth with a global emphasis has given a new technological challenge for wireless information network designers. This increased bandwidth will be gobbled up by both improved present and completely new wireless information services such as worldwide internet services, data communications, multimedia, virtual navigation, and telemedicine, wideband indoor wireless, to name a few. Over the last few years, a number of approaches have been taken to implement both terrestrial and satellite wireless services with an increased bandwidth. Methods include using efficient signal coding and modulation schemes, the use of spatial processing using microwave phased array antennas, and the transfer to higher radio frequencies (e.g., into the millimeter band) for the carrier. More recently, a bold and potentially high payoff approach of pushing the carrier all the way up to the optical frequency has been chosen to get the ultimate jump in information bandwidth into the several gigabits per second (Gb/s) regime. Specifically, commercial communication companies are making strides to deploy freespace optical communications for ultrawideband (e.g., upto 10 Gb/s) wireless links. One application is long range intersatellite links, while another focus is short haul (e.g., <5 km) terrestrial links in air. Another application being considered using freespace optical communications is indoor wireless. Free-space optics technology is expected to deliver unprecedented wide bandwidths, massive carrier reuse, ultra-low interchannel interference, and cost savings where electrical wires and optical fibers are too expensive to deploy and maintain.

With this initial driving motivation in mind, the next natural step in freespace optical communications for wireless is the use of inertialess optical scanners as the agile free space light routing method within a multi-user free-space optical wireless network to realize all-optical advanced wireless networking. This would lead to a wireless network essentially transparent to the information bandwidth, implying ultra-wideband operation. Depending on the wireless scenario, the impact and benefits are different yet highly significant. For instance, optical intersatellite links can use the highly accurate and fast beam pointing capabilities of the scanner to enhance the tradeoff between link distance and data rates. Similarly, indoor optical wireless can be greatly more power efficient and eye safe when using a scanner coupled with the optical link.

Freespace optical wireless links for satellite and outdoor terrestrial applications currently under development mainly use large and costly mechanically actuated mirrors and lenses to focus and direct light to the remote optical transceiver to maximize signal-to-noise ratio and hence bandwidth. This alignment process is slow and power consuming and requires precise mechanical motion of optics that are prone to misalignments due to vibrations and other environmental effects. Furthermore, the mounting mechanics can occupy a large fraction of the transceiver frontend, restricting overall head size, weight, and volume. For low earth orbit satellite systems, this is particularly a major problem from a payload point of view as short (<1 min.) acquisition times are required. Thus, as recently pointed out, the pointing, acquisition and tracking subsystems in an optical intersatellite link terminal presently pose key technical and economic problems. Hence, one objective in this patent application is to invent and develop new low cost, compact, and high performance (including microseconds domain high speed) optical scanner technology that can be applied for inertialess beam pointing, acquisition and tracking for both satellite and ground-based optical wireless links. Another objective is to show by example how the proposed scanners can solve the problems facing current indoor optical wireless links. Over the past decade, indoor optical wireless has developed concentrating on a technique called diffused infrared radiation (DFIR) technology. In DFIR wireless, the roof of a room has an optical data source whose light is diffused and scattered in the room volume so any wide angle optical receiver in any location of the room can pick up the signal. Although this method lends itself to receiver portability, it requires high optical power and suffers from bandwidth limits due to multipath effects. In addition, DFIR can suffer from eye safety issues as the room is permeated with IR radiation. To solve most of these problems, the directed-beam IR (DBIR) technique was developed that uses a single directed beam from the optical satellite on the room roof. Here, the eye safe 1550 nm wavelength beam direction is fixed such that it points to the fixed receiver. This technique requires accurate beam alignment and suffers from catastrophic failure when the beam might be temporally blocked by some moving object or person. Hence, DBIR has found limited commercial use as it is not appropriate for moving platforms. In this application, we propose a scanner use that using a combination of DBIR and DFIR implemented through the use of our proposed scanner technology is able to retain the best attributes of both DBIR and DFIR, leading to wideband, efficient power consumption, wireless optical links that do require fixed and no-mobile status of the transceivers.

Another important application for optical scanners is in data storage and retrieval whether it is personal computers (PCs), main frames or some other database system. The ever-increasing processing power and ultra fast fiber-optic networks have put enormous pressure on shared/distributed data storage devices for fast and efficient handling of massive data. So far, only mechanical systems have been devised to access different locations of a storage device for data storage and retrieval. For instance, a compact disc (CD)

drive rotates the CD whereas the laser head scans in a radial direction to access different locations on the CD. Accessing different locations of a storage device at a fast speed for data handling is limited due to the mechanical inertia associated with these systems. Very high speed optical scanning can be used for rapidly accessing these storage devices to handle data at exceedingly fast rates. In this application, scanners are proposed that can be used to form high speed fiber-optic scanning systems for data handling in 2D and 3D data storage devices. The proposed architectures produce fast, e.g., less than a microsecond per scan spot beams. The potential speed of the proposed scanners is in the GigaHertz rates using present-day state-of-the-art nanosecond tuning speed lasers.

High speed optical scanners are also needed in numerous other applications. The proposed scanners in this patent application can benefit other applications such as optically coupled ultrasonics, biomedical optical probes, non-destructive testing and evaluation, laser machining and cutting, three dimensional object reconstruction, displays, scanning microscopy and interferometry, optical switching, optical attenuation controls, optical time delay controls, to name a few.

BACKGROUND OF INVENTION

Over the years, a number of scanner technologies have been developed that fail to satisfy all the present needs of the desired scanner. Acoustooptics has speed but is power hungry, with limitations in beam programmability. Bulk electrooptics require high voltages and integrated-optic electro-optics such as piezoceramics steerers have small apertures sizes with high voltages. More recently, optical microelectromechanical systems (MEMS) using micromirrors offer promise, but are presently limited to small apertures (<2 mm) with a speed versus mirror size dilemma due to the inherent mechanical inertia of these mirror components. Similarly, the motion of a microlens array can be used to form a scanner, again limited in speed due to the mechanical nature of the beam scanning method.

Perhaps, the most successful optical scanner has been the nematic liquid crystal (NLC)-based optical scanner device that infact satisfies all but one requirement, i.e., fast speed, of the future scanner. NLCs at present are limited to millisecond or at best sub-millisecond speeds, and are therefore perhaps a factor of one hundred away from the required speeds. Hence, a significant breakthrough in NLC materials is required to break the microsecond barrier. An example NLC-based scanner is described in N. A. Riza and M. C. DeJule, "Three terminal adaptive nematic liquid crystal lens device" *Optics Letters*, Vol.19, No.14, pp. 1013–15, July, 1994. Nevertheless, the fundamental planar flat panel design aspect of NLC scanners, namely, the use of large area glasses, birefringent thin films, and electrically programmed optical phase plates is highly effective to realize a powerful scanner stressing the features of large size at low costs. Hence recently as described in N. A. Riza, "BOPSCAN Technology: A methodology and implementation of the billion point optical scanner," OSA Topical Mtg., 1998 International Optical Design Conference (IODC), SPIE Proc. 3482, Hawaii, June 1998; and N. A. Riza , "Digital control polarization-based optical scanner," U.S. Pat. No. 6,031,658, Feb. 29, 2000, a polarization multiplexing technique has been proposed to increase the speed of NLC or birefringent material-based scanners realized the polarization multiplexed optical scanner (P-MOS). A variant of the P-MOS called the time multiplexed optical scanner (T-MOS) has also been proposed (see N. A. Riza, "Multi-plexed optical scanner technology (MOST)," IEEE LEOS Annual Meeting, paper ThP5, Pueto Rico, USA, Nov. 12, 2000) to increase the speed of NLC scanners.

The P-MOS uses a binary switched serial beam control architecture with polarization multiplexing that results in an N-bit cascaded 3-D beamforming control architecture with efficient binary scaling of scanner space bandwidth product. The P-MOS uses single pixel 90 degree linear polarization rotators such as ferroelectric liquid crystal (FLC) cells to act as the electrically controlled polarization multiplexing components. The 3-D beamforming information such as tilt and lensing refractive index gradients are stored in large area birefringent phase plates. These phase plates can be electronically programmable thin film devices like birefringent-mode (BM) multi-pixel NLC devices or fixed phase pattern phase plates made from a variety of materials such as the PTR glasses. Depending on the spatial frequency content of the synthesized birefringent phase plates, both wide angle and small angle beam control can be simultaneously provided by the P-MOS. For $2^N$ independent 3-D beam patterns, N binary FLC cells and N birefringent phase plates are required. The key asset of the P-MOS is maximum hardware compression, as 20 stages can provide over a million independent beams in space. If the N phase plates are programmable BM NLC devices, the P-MOS cascaded architecture leads to a N times faster scanner reconfiguration time compared to a single BM-NLC device scanner. By controlling the polarization rotation settings of the N FLC cells, one can make sure that at any instant, only one NLC device is seen by the optical beam traveling through the P-MOS structure. Thus, if an NLC device has a 100 microsec reset time, a P-MOS using N=10 NLC devices leads to a scanner with a 10 microsec reset time. We can use this time multiplexed version of the P-MOS to realize the T-MOS. The T-MOS features complete beam programmability and adaptability using mature and reliable components. Because a BM-NLC device can have a million pixels like in a commercial LC display, the T-MOS scanner has a high space bandwidth product leading to many beams. Nevertheless, the P-MOS and T-MOS suffer from potentially high losses due to the serial cascading nature of the scanner architecture. Hence, it would be highly desirable to reduce the limitations of the P-MOS, T-MOS, plus the previously mentioned prior art scanners.

This application proposes two new types of scanners using multiplexing of wavelengths and spatial codes. The scanners are called wavelength multiplexed optical scanner (W-MOS) and code multiplexed optical scanner (C-MOS). In effect, independent exploitation of optical code switching via a high speed SLM is used to access 3-D phase perturbations stored in optical storage materials such as large area fixed phase sensitive photothermal refractive (PTR) glasses, photorefractive crystals, or any other holographic storage devices to realize a high speed C-MOS. In the W-MOS, high speed wavelength selection or tuning is used in conjunction with wavelength dispersive elements to realize scanning optical beams.

It has been known (see J. Rosen, M. Segev and A. Yariv, "Wavelength-multiplexed computer-generated volume holography," *Optics Letters*, Vol. 18, No. 9, pp. 744–746, May 1993) that multiple volume holograms with different tilt angles owing to different grating periodicity can be stored in a volume storage medium, and these holograms with their corresponding two dimensional image data information can be simultaneously and independently readout by using a colinear read beam with multiple wavelengths, thus leading to angularly spaced output images on different specific wavelengths. This is an example of multi-wavelength information retrieval where no high speed scanning (or tuning) of wavelengths is proposed.

Use of multiple simultaneous wavelengths with a single fiber and a wavelength dispersive element to form a multi-point sensor head was proposed in N. A. Riza, "Photonically controlled ultrasonic probes," U.S. Pat. No. 5,718,226, Feb. 17, 1998; N. A. Riza, "Photonically controlled ultrasonic arrays: Scenarios and systems," *IEEE Ultrasonic Symposium*, Vol. 2, pp. 1545–1550, November 1996; N. A. Riza, "Wavelength Switched Fiber-Optically Controlled Ultrasonic Intracavity Probes," *IEEE LEOS Ann. Mtg. Digest*, pp.31–36, Boston, 1996. Later, a similar multi-wavelength starring concept (see G. J. Tearney, R. H. Webb, and B. E. Bouma, "Spectrally encoded confocal microscopy," *Optics Letters*, Vol. 23, No. 15, pp. 1152–1154, August 1998) using a non-volume dispersive element such as a grating was used to simultaneously create multiple spatially separated probe beams for optical microscopy. Again, no fast tuning of the wavelength is exploited.

Use of simultaneous multiple wavelengths was also used for transmitting an image through a single fiber (see D. Mendlovic, J. Garcia, Z. Zalevsky, E. Marom, D. Mas, C. Ferreira, and A. W. Lohmann, "Wavelength-multiplexing system for single-mode image transmission," *Applied Optics*, Vol. 36, No. 32, pp. 8474–8480, November 1997). Similarly, multiwavelengths were also proposed for reading two-dimensional orthogonal codes used in a spatial code division multiple access optical communication fiber network (see N. A. Riza and S. Sumriddetchkajorn, "Micromechanics-based Wavelength Sensitive Fiber-Optic Beam Control Structures and Applications," Applied Optics, Feb. 20, 2000).

As in G. Q. Xiao, T. R. Corle, G. S. Kino, "Real time confocal scanning optical microscope," Applied Physics Letters, Vol.53, pp.716–718, 1988; H. J. Tiziani and H.-M. Uhde, "Three-dimensional image sensing by chromatic confocal microscopy," *Applied Optics*, Vol. 33, No. 10, pp. 1838–1843, April 1994, light containing multiple wavelengths has also been used with the chromatic dispersions of optical lenses to implement on-axis sliced imaging where each image slice in the z-axis (or optical travel) direction corresponds to a particular wavelength in the broadband light. Again, no high speed tuning of wavelengths is used for scanning.

As in M. Krichever, J. Companelli, L. Courtney, P. Fazekas, J. kahn, J. Swartz, V. Gurevich, and B. Metlitsky, "Electro-optical scanner having selectable scan pattern," U.S. Pat. No. 5,988,502, Nov. 23, 1999, multiple free-space laser beams, each of a different but fixed wavelength have also been arranged in different spatial positions to result in a more extensive beam scan zone as compared to using only one moving mirror scanned beam. Here, each beam on a different wavelength has its own moving optics, resulting in its predesigned scan beam. Again, no high speed tuning of wavelengths is used for scanning.

Previously (see L. J. Lembo, T. Holcomb, M. Wickham, P. Wisseman, J. C. Brock, "Low fiber-optic time delay element for phased array antennas," SPIE Vol. 2155, pp.13–23, Los Angeles, January, 1994), high speed wavelength tuning has been proposed to access different optical time delays, as required in phased array antenna beamforming applications. Wavelength selection through programmable optical filters has also been proposed to generate time delays as described in N. A. Riza, "Photonically controlled ultrasonic probes," U.S. Pat. No. 5,718,226, Feb. 17, 1998.

Recently, as proposed in N. A. Riza and Y. Huang, "High speed optical scanner for multi-dimensional beam pointing and acquisition," *IEEE-LEOS Annual Meeting*, San Francisco, Calif., pp. 184–185, November 1999; and N. A. Riza and Z. Yaqoob, "High Speed Fiberoptic Probe for Dynamic Blood Analysis Measurements," *EBIOS 2000: EOS/SPIE European Biomedical Optics Week*, SPIE Proc. vol. 4613, Amsterdam, July 2000, high speed wavelength tuning or selection can be used to form a highly versatile optical scanner. This scanner has been further described in N. A. Riza , "Multiplexed optical scanner technology (MOST)," IEEE LEOS Annual Meeting, paper ThP5, Pueto Rico, USA, Nov. 12, 2000; and N. A. Riza and Z. Yaqoob, "Ultra-high speed scanner for data handling," IEEE LEOS Annual Meeting, paper ThP2, Pueto Rico, USA, Nov. 12, 2000. The purpose of this application is first to describe this wavelength tuned or selected scanner and elaborate on its embodiments and innovative application architectures.

Note that it is also proposed in N. A. Riza and Y. Huang, "High speed optical scanner for multi-dimensional beam pointing and acquisition," *IEEE-LEOS Annual Meeting*, San Francisco, Calif., pp. 184–185, November 1999, that diffractive optical elements (DOEs) can be combined with the proposed wavelength multiplexed optical scanner (W-MOS) to deliver the scanner's full three dimensional scanning ability. It is also well known that DOEs can be designed to be highly dispersive. In this perspective, using the DOE element with the tunable wavelength concept as proposed by N. A. Riza and combining it with the previously proposed lens chromatic dispersion confocal microscopy application (see G. Q. Xiao, T. R. Corle, G. S. Kino, "Real time confocal scanning optical microscope," Applied Physics Letters, Vol.53, pp.716–718, 1988), a recent experiment has been conducted (see G. Li, P.-C. Sun, P. C. Lin, and Y. Fainman, "Interference microscopy for threee-dimensional imaging with wavelength-to-depth encoding," *Optics Letters*, Vol. 25, No. 20, pp. 1505–1507, October 2000) to demonstrate these previously proposed concepts.

Another purpose of this application is to describe the C-MOS, such as described in N. A. Riza, "Reconfigurable optical wireless," *IEEE-LEOS Annual Meeting*, San Francisco, Calif., November 1999. C-MOS combines the principles of freespace spatial code division multiple access optical communications (see N. A. Riza, J. E. Hershey, and A. A. Hassan "Novel multi-dimensional coding scheme for multi-access optical communications," *Multigigabit Fiber Communications OE/Fibers Conference Proceedings of SPIE*, Vol. 1790, pp. 110–120, 1992; N. A. Riza, J. E. Hershey, and A. A. Hassan "A signaling system for multiple access laser communications and interference protection" *Applied Optics*, Vol. 32, No. 11, pp. 1965–1972, Apr. 10, 1993; N. A. Riza, J. E. Hershey, and A. A. Hassan, "Optical communication system using coplanar light modulators," U.S. Pat. No. 5,410,147, Apr. 25, 1995; J. A. Salehi and E. G. Paek, "Holographic CDMA," *IEEE Trans. On Communications*, Vol.43, No.9, pp.2434–2438, September 1995) with holographic information storage to realize a spatial code driven optical scanner. The C-MOS operates in a principle that is reverse to that used in previously developed holographic data storage system. Namely, in holographic data storage, information in the form of analog images or digital two dimensional bit maps typically have space bandwidth products of one million points are stored using holography in a storage medium. The to be stored one million point data is introduced into the optical system via a SLM such as a 2-D NLC SLM. Generally, to be cost effective as a memory device, thousands of images are required to be stored in the volume holographic storage element. More over, each individual million point data page must be independently recovered with very low image recovery error rates. Furthermore, image recovery should occur without erasing the other stored data or generating crosstalk between the stored images. These are all very stringent requirements placed by the data storage industry, and as of today, holographic data storage has made great strides, but is yet to meet these requirements.

Various methods have been deployed to record and recover data pages with improved crosstalk levels. These are described in the following prior art on holographic data storage: F. H. Mok, "Angle-multiplexed storage of 5000 holograms in lithium niobate," *Optics Letters*, Vol. 18, No. 11, pp. 915–917, June 1993; J. H. Hong, I. McMichael, T. Y. Chang, W. Christian, E. G. Paek, "Volume holographic memory systems: techniques and architectures," *Optical Engineering*, Vol. 34, No. 8, pp. 2193–2203, August 1995; G. W. Burr, F. H. Mok, and D. Psaltis, "Angle and space multiplexed holographic storage using the 90° geometry," *Optics Communications*, Vol. 117, pp. 49–55, May 1995; G. A. Rakuljic, V. Leyva, and A. Yariv, "Optical data storage by using orthogonal wavelength-multiplexed volume holograms," *Optics Letters*, Vol. 17, No. 20, pp. 1471–1473, October 1992; M. C. Bashaw, R. C. Singer, J. F. Heanue, and L. Hesselink, "Coded-wavelength multiplex volume holography," *Optics Letters*, Vol. 20, No. 18, pp. 1916–1918, September 1995; K. Curtis, A. Pu, and D. Psaltis, "Method for holographic storage using peristrophic multiplexing," *Optics Letters*, Vol. 19, No. 13, pp. 993–994, July 1994; J. F. Heanue, M. C. Bashaw, and L. Hesselink, "Recall of linear combinations of stored data pages based on phase-code multiplexing in volume holography," *Optics Letters*, Vol. 19, No. 14, pp. 1079–1081, July 1994; C. Alves, G. Pauliat, and G. Roosen, "Dynamic phase-encoding storage of 64 images in a $BaTiO_3$ photorefractive crystal," *Optics Letters*, Vol. 19, No. 22, pp. 1894–1896, November 1994; D. Psaltis, M. Levene, A. Pu, G. Barbastathis, and K. Curtis, "Holographic storage using shift multiplexing," *Optics Letters*, Vol. 20, No. 7, pp. 782–784, April 1995; X. Yang, Y. Xu, Z. Wen, "Generation of Hadamard matrices for phase-code-multiplexed holographic memories," *Optics Letters*, Vol.21, No.14, pp.1067–1069, Jul. 15, 1996; Z. Wen, Y. Tao, "Orthogonal codes and crosstalk in phase-code multiplexed volume holographic data storage," *Optics Communications*, Vol.148, pp.11–17, Mar. 1, 1998.

All these holographic storage methods focus on adjusting the reference beams that are used to interfere with the signal beams that carry the image information input from the image or signal SLM. Reference beams have been angularly adjusted, or different wavelength reference beams have been deployed, or two-dimensional phase coding of the reference beams have been deployed to record the many data pages. Because each image can have a million points, and thousands of images must be stored, the reference beam manipulation process requires high information content (1 million× one thousand=1 billion points) or degrees of freedom, making holographic image storage a very formidable task. In other words, the holographic storage medium must have an information capacity of one billion data points, a very tall requirement for any holographic optical material.

The approach to forming the C-MOS is in reverse to the principles and needs of holographic image storage. Namely, in the C-MOS case perhaps a thousand or so beams need to be generated where in the basic C-MOS design case, each beam corresponds to a single point in the far field optical space (not a million point image) of the scanner. In other words, a storage system needs to be realized that can recover a thousand single points, not a billion single points. A different way to say this is that in its most basic form (i.e., point scans in the far field), the C-MOS requires a holographic storage medium with a million data point storage capacity assuming each code consists of a 1000 data points. The implementation of the C-MOS is also reverse to holographic data storage as this time the signal beam is spatially coded with for example 1000 different orthogonal spatial codes (e.g., as a minimum, a 10-bit digital code set can result 1024 different codes), each code corresponding to a specific different reference beam. Walsh and Hadamard orthogonal code sets can be deployed, as used in electronic communications. For example, the reference beam can be generated by a 2-axis mirror with 32 x-tilt positions and 32 y-tilt positions to realize 1024 far field points in space (x is horizontal and y is vertical directions in the scanner's cartesian coordinate scan space). Furthermore, more complex 3-D reference beams can be generated using another SLM in the reference beam path. Hence, when a particular 2-D code is input to the signal beam SLM, a particular reference beam is recovered that then acts as the scan beam in the far field for the scanner. This is in exact opposite to the holographic data storage process where a reference beam is generated to recover the data page.

This application later describes the operation of the proposed C-MOS as described in N. A. Riza, "Reconfigurable optical wireless," *IEEE-LEOS Annual Meeting*, San Francisco, Calif., pp. 70–71, November 1999, where N. A. Riza introduces the concept of a spatial code division multiple access (CDMA) scanner, with no moving parts. A holographic material is used to record scan beam generation holograms using an orthogonal set of spatial codes. When the incident light with right spatial code is incident on the hologram, its corresponding scan beam is generated. Fast spatial light modulators (SLMs) can be used to generate and access the spatial codes using optical phase, amplitude and polarization coding formats. The scanner can possess powerful properties such as wide angle scan beams, large number of beams, high resolution scanning, and large aperture scans at high speeds.

Prior art has deployed holograms to make scanners, but all with some sort of moving parts thus limiting the scanning speeds. In I. Cindrich, "Image scanning by rotation of a hologram," *Applied Optics*, Vol. 6, No. 9, pp. 1531–1534, September 1967, a holographic designed is proposed for beam forming and beam deflection. A transmissive hologram of a point object is recorded on the holographic plate, using a collimate beam as a reference. Therefore, when the reference beam is incident on the hologram, it generates a point object. When the hologram is rotated mechanically around its own axis, the point traverses a circular path. In D. H. McMahon, A. R. Franklin, and J. B. Thaxter, "Light beam deflection using holographic scanning technique," *Applied Optics*, Vol. 8, No. 2, pp. 399–402, February 1969, a technique for producing two-dimensional raster scan through the use of a one-dimensional circular motion is presented. Holographic patterns are stored on the circumference of a holographic plate. The reference beam is kept fixed whereas the signal beam is tilted at different angle for each holographic pattern. When the disc is rotated through an angle $\phi$, a vertical scan is observed. $2^{nd}$ hologram gives the second vertical line and so on. In R. V. Pole and H. P. Wollenmann, "Holographic laser beam deflector," *Applied Optics*, Vol. 14, No. 4, pp. 976–980, April 1975, a mechanically rotating laser beam deflector is described that consists of several transmission type holograms recorded on a cylindrical surface. Two coherent beams, once convergent and the other divergent, are used to store an interference pattern on the inner surface of the cylinder. When the resulting hologram is illuminated only by a fraction of the original reference beam, only an angular fraction of the original beam is reconstructed. When the hologram is moved (by rotating the cylinder), the fractional cone will reconstructed, propagating in the direction in which it was propagating during the recording process. More than one hologram can be recorded on the inner side of the cylinder for 2-D scans. In O. Bryngdahl and W.-H. Lee, "Laser beam scanning using computer-generated holograms," *Applied Optics*, Vol. 15, No. 1, pp. 183–194, January 1976, a laser scanner based on a computer-generated hologram (CGH) is introduced. The scan line is generated in the back focal plane of a lens, when different parts of the CGH are moved across the laser beam. When mounted on a rotating disk, the CGH can also provide a 2-D raster scan. The diffraction efficiency of CGH cannot increase 41% (theoretical limit), but the wavefront in CGH can be reconstructed and used to form a corresponding volume hologram, increasing the diffraction efficiency closed to 100%. In addition, the CGH can fix the field curvature of the scanning beam. In W.-H. Lee, "Holographic grating scanners with aberration corrections," *Applied Optics*, Vol. 16, No. 5, pp. 1392–1399, May 1977, optically recorded Fresnel zone plates have been introduced to make a laser scanner. The Fresnel zone plates can be made by recording the interference pattern between a divergent wavefront and a collimated reference beam. Point source hologram, also known as interference zone plate (IZP) can be used for applications where large scan angle is needed. The IZP's can be wrapped around the circumference of a rotating drum to achieve the scanning.

In Y. Ono and N. Nishida, "Holographic laser scanners for multidirectional scanning," *Applied Optics*, Vol. 22, No. 14, pp. 2128–2131, July 1983, phase distributions to generate holograms for use in laser scanning are investigated, to generate multi-directional scanning patterns. The paper discusses hyperbolic, elliptical and circular phase distribution holograms for laser beam scanning. These phase distributions can be generated by using a cylindrical-lens combination. The hyperbolic phase-distribution hologram is used to scan an incident beam in a direction perpendicular to the hologram moving direction. Multidirectional scanning has been demonstrated with drum configuration holograms generated by the proposed phase-distribution generating method. Y. Ono and N. Nishida, "Holographic disk scanners for bow-free scanning," *Applied Optics*, Vol. 22, No. 14, pp. 2128–2131, July 1983, proposes a holographic scanner in disk configuration for bow-free flat-field scanning. When a laser beam illuminates zone plates in normal incidence, the beam is diffracted in a radial direction. Thus, when the disk is rotated, the scanner generates a bowed scan line. Bow-free conditions have been derived for the holographic disk design. The scanner based on the new holographic disk gives a bow deviation of less than ±100 $\mu$m for a 40-cm scan length, on a scanning plane at a distance of 80 cm from the holographic disk. In C. C. K. Cheng, "Design for a commercial application of a holographic scanning system," Proc. SPIE, Vol. 600, pp. 204–214, 1985, similar to I. Cindrich's work, this article proposes a laser scanner based on a rotating hologram. A holographic scanning system is developed using dichromated gelatin holograms. As suggested in D. H. McMahon's work, when the holograms are mounted along the circumference of a rotating disc, different scanning lines are observed for different holograms. S. Iwata, S.-Y. Hasegawa, S. Maeda, S. Kayashima, and F. Yamagishi, "Holographic straight line scanner using a holoplate," Proc. SPIE, Vol. 1667, pp. 284–288, September 1992 presents a holographic line scanner that compensates for large wavelength shifts. The scanner consists of two holograms, one being a rotating holographic disk and the other a plate-type hologram called "holoplate". The scanner minimizes beam positional errors and beam aberration due to wavelength variations and multimodes.

S. F. Sagan and D. M. Rowe, "Holographic laser imaging system," Proc. SPEE, Vol. 2383, pp. 398–407, 1995, presents designs for laser scanners that are well corrected for linearity and line bow. The scanner consists of a pre-scan holographic optical element (HOE), a rotating holographic disk, and a post-scan HOE. The features of the designs are telecentricity at the focal plane and achromatic correction for both cross-scan and in-scan errors due to wavelength variations. Throughput efficiency is optimized with the use of the higher scan efficiency provided by holographic scan disk. In D. H. McMahon, "Three dimensional light beam scanner utilizing tandemly arranged diffraction gratings," U.S. Pat. No. 3,619,033, Nov. 9, 1971, the scanner is based on a technique for producing two-dimensional raster scan through the use of a one-dimensional circular motion. Holographic patterns are stored on the circumference of a holographic plate. The reference beam is kept fixed whereas the signal beam is tilted at different angle $\theta$, for each holographic pattern. When the disc is rotated through an angle $\phi$, a vertical scan is observed. $2^{nd}$ hologram gives the second vertical line and so on. Another design consists of a lenses mounted on a rotating disk in a spiral fashion. When the light sweeps on one the lenses, it scans one horizontal light. Thus, when the disk rotates, a pattern of horizontal lines is observed since the lenses have been placed in a spiral fashion. In L. Beiser, "Light scanning system utilizing diffraction optics," U.S. Pat. No. 3,614,193, Oct. 19, 1971, the optical scanner consists of a spinner element in the form of a partial sphere having a plurality of diffracting zone-type lenses distributed over its surface and adapted for continuous rotation about a concentric axis. An off axis diffraction or geometric reflector converges the laser beam onto the spinner element. The individual zone-type lenses reconverge rays impinging thereon to new foci, which scan an image surface. In G. Pieuchard, J. Flamand, and A. Labeyrie, "Optical diffraction grating scanning device," U.S. Pat. No. 3,721,487, Mar. 20, 1973, the optical scanning device comprises of a monochromatic light source and diffraction gratings (in the form of sectors) mounted on a spherical concave surface for producing a number light spots. When the concave surface is rotated mechanically, the light-spots describe a single circle. Hence a line is scanned on the surface to be explored. To scan the whole area, the surface is moved mechanically between every two consecutive sweeps, so as to vary the position of the scanning line.

In A. Bramley, "Light scanning by interference grating and method," U.S. Pat. No. 3,721,486, Mar. 20, 1973, the proposed scanner is composed of two gratings placed in parallel planes and mounted on spaced parallel shafts. The shafts are driven by synchronous motors at the same angular velocity, but opposite directions. Light after passing through one rotating grating describes a circle. The second grating transforms the circular scan into a linear scan. In G. M. Heiling, "Straight-line optical scanner using rotating holograms," U.S. Pat. No. 4,094,576, Jun. 13, 1978, the scanner consists of a number of holograms made from the interference of a plane wavefront with a spherical wavefront modified by a cylindrical lens. When the disk is rotated, the pattern of holograms sweeps across the reconstruction reference beam. The resulting reconstructed wavefront is passed through another cylindrical lens, resulting in a focussed point sweeping across an object surface in one or more straight lines. H. Ikeda and M. Ando, "Holographic disk scanner," U.S. Pat. No. 4,235,504, Nov. 25, 1980, refers to a light scanning apparatus that is applied to, e.g., a point-of-scale (POS) system. The scanner is based on the idea of holographic patterns mounted on the circumference of a rotating disk. The diffracted light passes through some optics and scans the POS. In C. J. Kramer, "Optical scanner using plane linear diffraction gratings on a rotating spinner," U.S. Pat. No. 4,289,371, Sep. 15, 1981, an optical scanning system including a spinner containing plane linear diffraction gratings (PLDGs) is introduced. PLDGs are constructed such that the grating line of each PLDG passes through the axis of the spinner, and the ratio of the reconstruction wavelength to the grating period is a value lying between 1 to 1.618. When the spinner rotates, the incident laser beam scans across each PLDG, thus giving a set of vertical scanning beams in the observation plane. For bow minimization, the grating equation is solved to find a criterion that gives a range of incident and diffraction angles, where minimum bow in the scan line is observed. In L. D. Dickson, "Holographic scanner disc with different facet areas," U.S. Pat. No. 4,415,224, Nov. 15, 1983, a retroreflective type scanner is proposed having a coherent beam source, a multifaceted rotating holographic optical element, and a photosensitive detector for detecting the level of reflected light. The multifaceted rotating holographic optical element deflects the light along predetermined scan lines, as opposed to the conventional hologram bearing disks where multidirectional scanning patterns are generated. The surface of the disk has been divided into four sets of facets with each facet in a set having the same angular width as the corresponding facet in the other sets. The width of each facet in a set is calculated according to the scan requirements.

DESCRIPTION OF THE DRAWINGS

FIG. 4 made up of FIGS. 4(a) and 4(b) shows the proposed C-MOS.

SUMMARY DESCRIPTION OF THE INVENTION

Figure 1A:
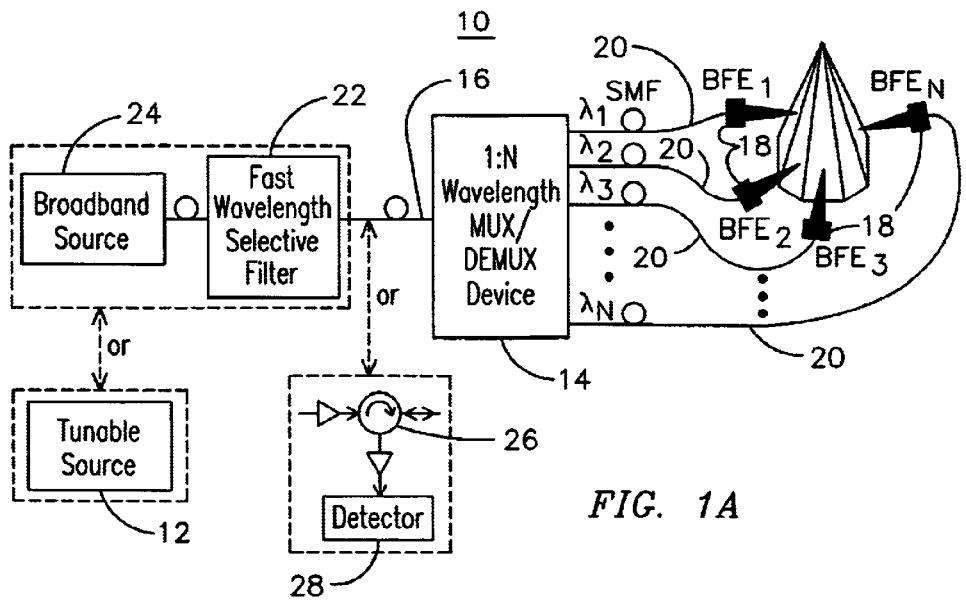
FIG. 1A shows a fiber-based W-MOS architecture for 3-D scans with up to 360 degree coverage including beamforming elements (BFEs) that can act as fixed or programmable scanning elements.
Figure 1B:
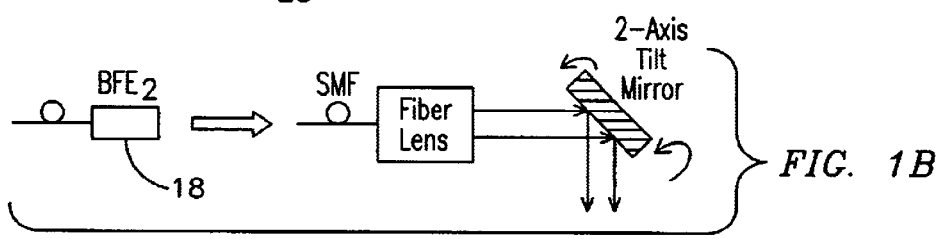
FIG. 1B shows a beam forming element of FIG. 1A including a two axis tilt mirror.

Two scanner concepts are described using multiplexing. The W-MOS gets its power from the use of a high speed tunable laser (or wavelength selective filter) cascaded with a wavelength dispersive element leading to spatially dispersed beams in 3-D space. A simple example of a dispersive element is a spatial grating written on a large area flat piece of glass. Depending on the wavelength, only one beam at a certain angle can be generated in space, thus forming a high speed 1-D deflector. The goal is to create as many beams as possible with the same diffraction efficiency over the entire wavelength sweeping range of the laser. Hence, the choice and design of the frequency selective optical element becomes critical. PTR glasses can record multiple gratings to realize the W-MOS. Multiple cascaded PTR plates can also be added to increase scanner functionality, leading to robust 3-D beam controls. In an W-MOS embodiment, the wide angular coverage scanning mechanism is achieved via flexible fiber-based wavelength division multiplexed (WDM) technology. Key features of the fiber-based W-MOS include a large field of view, a large scanning volume, and the ability to scan a complicated 3-D geometry. W-MOS in general can have a fast scanning speed. Wavelength selection can be accomplished through the use of a tunable laser or a combination of the broadband source and the wavelength selective filter. Beam forming element such as a bulk lens, a MEMS-based 2-axis micromirror, a diffractive optical element, and a liquid crystal beam steerer, or a C-MOS can also be attached to the fiber port of a fiber coupled WDM multiplexer to increase the scanning resolution and functionality. A free-space version of the W-MOS is also possible. The W-MOSs can also be used in reflective or reverse path scanner architectures when employing beam reversing optics such as optical circulators, and example applications are shown for 3-D beam pointing and reconstruction and fast data reading. The W-MOS can also be configured into a coherent or interferometric architecture using a 2×2 fiber-optic coupler when high optical sensitivity is required.

The C-MOS relies on holography for scan beam generation. Using an orthogonal set of spatial codes (e.g., binary phase-only codes) implemented through an SLM in the path of the input or signal beam, a set of holograms are recorded, each with a different reference beam. After storing and fixing all the holograms in the holographic material, the reference source is no longer needed and the spatial codes are regenerated in the signal beam via the signal beam SLM. Via holographic reconstruction, each spatial code generates its original reference beam that now acts as the output scanned beam. Hence, by cycling through the spatial codes, a C-MOS is realized. This process is in reverse to what is typically done in holographic data storage where signal or data beams are regenerated using specific reference beams. The number of beams generated in the C-MOS depends on the space bandwidth product of the spatial light modulator (SLM) that generates the codes and the angularly multiplexed storage capacity of the holographic material. The C-MOS features a single stage design that leads to low loss while maintaining large apertures. A optical wireless application is shown using the C-MOSs to give fault-tolerance to an indoor wireless network. An extension of the fiber W-MOS is the space multiplexed optical scanner (S-MOS) where the 1:N fiber WDM device is replaced by a wave insensitive 1×N fiber-optic switch and the N fiber ports are connected to any other MOS such as a freespace W-MOS and/or a C-MOS.

DETAILED DESCRIPTION OF THE INVENTION

An embodiment of the invention (see FIG. 1A) is a multi-dimensional optical scanning technique based on fiber-based wavelength division multiplexed (WDM) technology. This scanner can provide a large field of view (e.g., up to 360°), a large scanning volume, a fast scanning speed, and the ability to scan a complicated three-dimensional (3-D) geometry. WDM devices have been recently used in telecommunication optical networks. Commercial availability of very high density WDM devices with 132 or more channels at a 50 GHz spacing have become a reality (see J-P Laude, K. Lange, ",Dense WDMs and routers using diffraction gratings," NFOEC'99, p.83, Chicago, Ill., 1999). In a 1:N WDM demultiplexer device, light in the input fiber channel containing N wavelengths is split into N independent fiber channels using an optical dispersion technique. Possible dispersive elements can include wavelength sensitive angularly multiplexed holograms, integrated-optic arrayed waveguide gratings (AWGs), bulk-optic interference-film filters, photonic crystals, solid optic prisms, micro-machined Fabry-Perot filters, and fiber-Bragg grating devices. A variety of wavelength bands are possible, including the visible band using visible WDM devices. As we tune or select the wavelength of the light beam input to the demultiplexer, light is emitted from the appropriate fiber channel, and an optical scanner is realized.

Figure 1C:
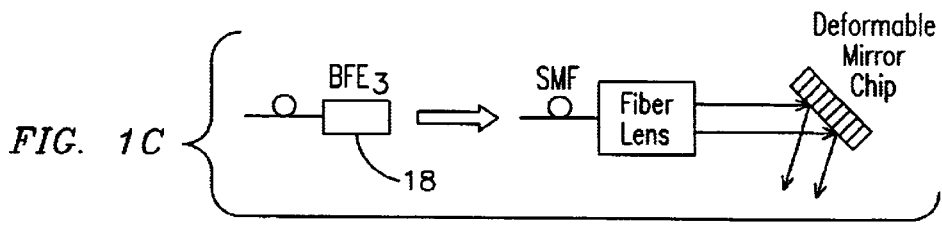
FIG. 1C shows a beam forming element of FIG. 1A including a deformable mirror chip.
Figure 1D:
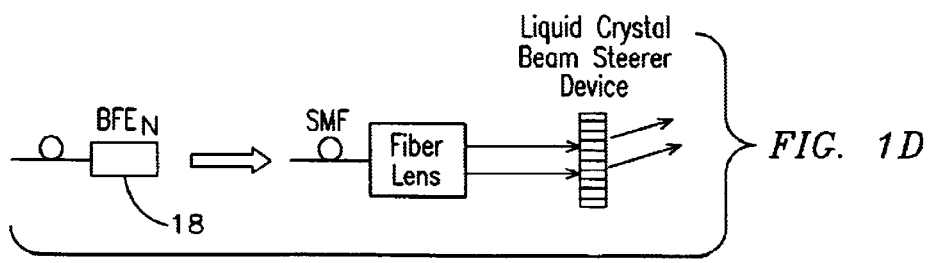
FIG. 1D shows a beam forming element of FIG. 1A including a liquid crystal beam steerer device.

The basic structure of a fiber-based W-MOS or $\lambda$ scanner is shown in FIG. 1A. In one design, a tunable laser 12 is connected to a 1:N WDM device 14 via a single mode fiber (SMF) 16. The demultiplexer 14 has N output channels, whose working wavelengths are $\lambda_1 \lambda_2 \lambda_N$. Only laser beam of wavelength $\lambda_i$ can pass through the ith fiber channel. These ports are further connected to N beamforming elements (BFEs) 18 via optical fibers 20. The BFE can be fixed such as a bulk lens, or a planar diffractive optical element (DOE) such as a grating, or Fresnel lens. Another option for the BFE is a MEMS-based micromirror scanner, such as a 2-axis tilt mirror as shown in FIG. 1C or a deformable mirror chip as shown in FIG. 1D, although this results in part of the overall scanner having moving parts. The BFE can also be an optically or electrically programmable optical element, such as a liquid crystal beam steerer as shown in FIG. 1E. For instance, a BFE can focus the beam on the surface of an object. On the other hand, it can scan small angles to interconnect the 3-D scan space. A significant advantage of this optical scanner is its flexibility as the scanning profile can be adjusted according to the configuration of the object. This scanner can realize one-dimensional (1-D), two-dimensional (2-D), and 3-D scanning by controlling the fiber port positions and the orientations of the BFEs. The speed of the scanner is based on the tuning speed of the tunable laser 12 or wavelength selective filter 22. Recently a wavelength switching time of 25 ns has been reported in a sampled-grating DBR laser over a 44 nm bandwidth (see B. Broberg, P-J Rigole, S. Nilsson, M. Renland, L. Anderson, "Widely tunable semiconductor lasers," IEEE LEOS Annual Mtg, p.151, December 1998). The W-MOS also provides simultaneous multiple beam generation capability via multi-lambda drive by electrically driving the optical filter with multiple electrical signals corresponding to simultaneously selected multiple wavelengths. Using a circulator, a reflective architecture is also possible for the scanner. As shown, the optical source can be laser 12 or filter 22. Use of filter 22 requires a broadband optical source 24. For 3-D measurement, the optical signals reflected at each BFE 18 is returned through multiplexor 14. The reflected signals are then coupled through an optical circulator 26 and passed to a detector 28.

The embodiment in FIG. 1A described a fiber distributed wavelength multiplexed optical scanner (W-MOS) for three dimensional data acquisition and pointing. Using these basics concepts of the W-MOS, a fiber-optic no-moving parts scanner 30 using a freespace version of the W-MOS shown in FIG. 2 (see also N. A. Riza and Z. Yaqoob, "High Speed Fiber-optic Probe for Dynamic Blood Analysis Measurements," EBIOS 2000: EOS/SPIE European Biomedical Optics Week, SPIE Proc. vol. 4613, Amsterdam, July 2000) can be used to enable high speed spatial scanning capabilities for optical data handling. An extension of the fiber W-MOS is the space multiplexed optical scanner (S-MOS) where the 1:N fiber WDM device is replaced by a wave insensitive 1×N fiber-optic switch and the N fiber ports are connected to any other MOS such as a freespace W-MOS and/or a C-MOS. The free-space scanner 30 uses laser 12 with focusing lenses 32 and 34 to create a wide beam 36 that is focused on a wave length sensitive element such as a holographic grating 38. The element 38 deflects beam 36 at an angle that is wavelength or frequency dependent so that changing frequency using laser 12 effects scanning of the beam 36. The laser 12 may include a broadband laser 24 and tunable filter 22 for generating optical beams having multiple different wavelengths. In one aspect, the free-space scanner 30 may include a circulator 26 coupled to an optical to electrical detector 28 to provide a receive mode thus providing multiple beam generation and reception.

The embodiment in FIG. 1A described a fiber distributed wavelength multiplexed optical scanner (W-MOS) for three dimensional data acquisition and pointing. Using these basics concepts of the W-MOS, a fiber-optic no-moving parts scanner 30 using a freespace version of the W-MOS shown in FIG. 2 (see also N. A. Riza and Z. Yaqoob, "High Speed Fiber-optic Probe for Dynamic Blood Analysis Measurements," *EBIOS* 2000: *EOS/SPIE European Biomedical Optics Week*, SPIE Proc. vol. 4613, Amsterdam, July 2000) can be used to enable high speed spatial scanning capabilities for optical data handling. An extension of the fiber W-MOS is the space multiplexed optical scanner (S-MOS) where the 1:N fiber WDM device is replaced by a wave insensitive 1×N fiber-optic switch and the N fiber ports are connected to any other MOS such as a freespace W-MOS and/or a C-MOS. The free-space scanner 30 uses laser 12 with focusing lenses 32 and 34 to create a wide beam 36 that is focused on a wave length sensitive element such as a holographic grating 38. The element 38 deflects beam 36 at an angle that is wavelength or frequency dependent so that changing frequency using laser 12 effects scanning of the beam 36. The laser 12 may include a broadband laser 24 and tunable filter 22 for generating optical beams having multiple different wavelengths. In one aspect, the free-space scanner 30 may include a circulator 26 coupled to an optical to electrical detector 28 to provide a receive mode thus providing multiple beam generation and reception. In yet another aspect, the free-space scanner 30 may include a fixed reference mirror 39 to allow interferometric optical detection when engaging light from the fixed reference mirror. Accordingly, the scanner 30 may be used as an interferometric scanning sensor to provide both incoherent optical detection and coherent detection.

Figures 2, 3A:
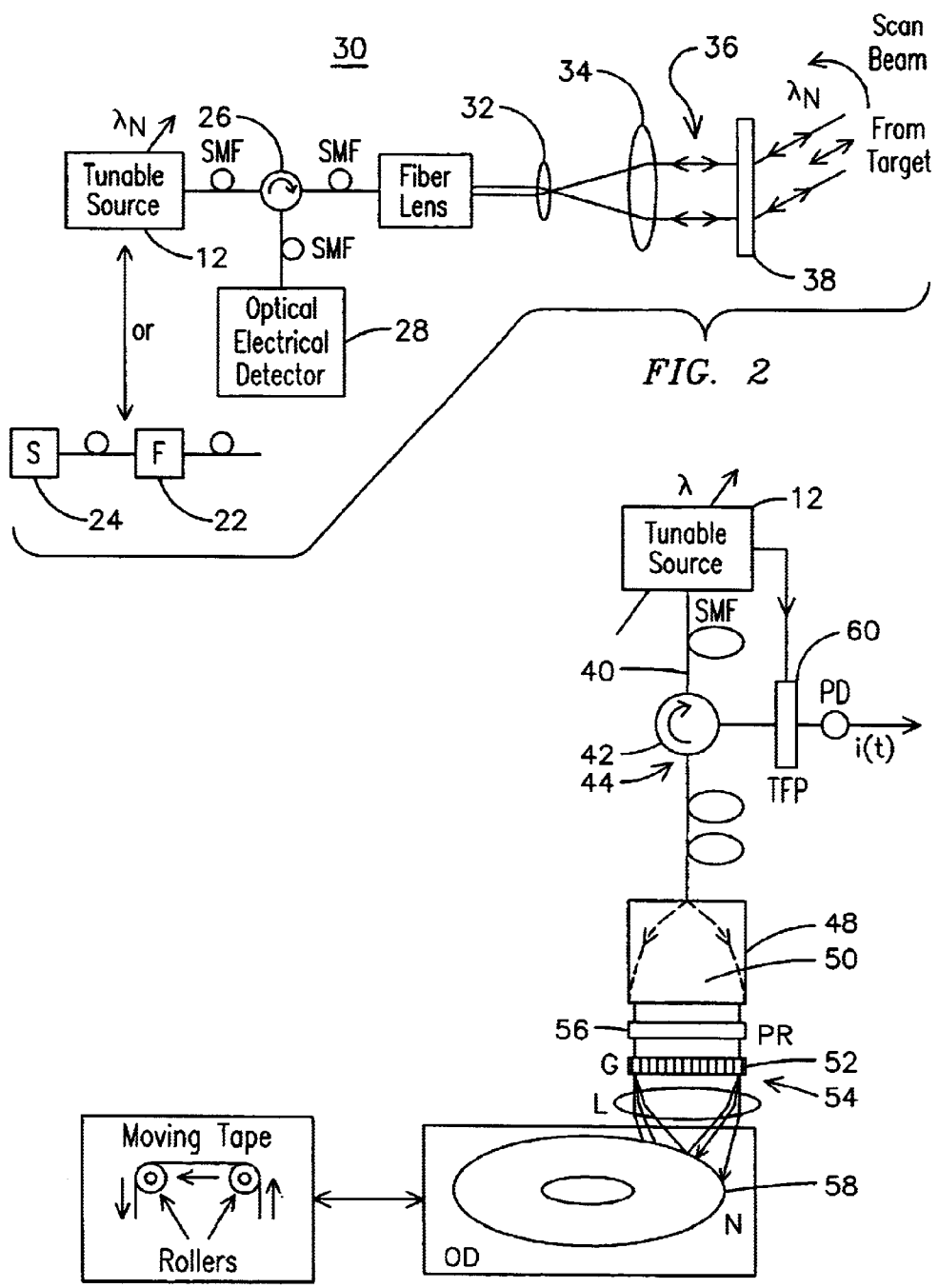
FIG. 2 is an alternative embodiment of the shows a free space W-MOS architecture based on free-space optics where magnification optics and freespace coupled wavelength dispersive element such as a one-dimensional grating is used to angularly separate the different wavelengths.
FIG. 3A shows how the proposed W-MOS can be used in various data storage systems. (a) shows a W-MOS based scanning 2D data handling system for disks and tapes., (b)

FIG. 3A shows how the W-MOS beam scanning system can be used for optical data handling in 2D optical data storage devices. A high-speed tunable laser 12 is fiber-coupled via fiber 40 to a fiber-optic circulator 42. The straight port 44 of the circulator is connected to a fiber-optic cable 46 that terminates in the scanning head 48. A typical fiber can be a single mode fiber (SMF)used for telecommunications with a 8 micron core and a 125 micron cladding. The fiber/cladding end is fused to a fiber-collimating lens 50 such as a solid-optic gradient-index (GRIN) lens. The collimated light from the GRIN lens passes through a wavelength dispersive element 52 such as a one-dimensional (1D) grating etched on a thin piece of optics. After the grating, a Fourier transforming lens 54 completes the scanning head. A 45° power Faraday rotator plate 56 is inserted between the GRIN lens and the multiplexer to compensate for birefringence effects due to temperature variations and stresses in the fiber cable. By changing the wavelength via electronic control of the tunable laser 12, the light output from the probe 48 tip moves spatially along a defined axis, creating an array of optical dots on the storage device. For instance, the compact disk (CD) 58 shown in FIG. 3 can be set onto a rotating platform, whereas the optical beam can be scanned in the radial direction at an ultra high speed. The reflected light from the storage device travels through the same scanning optics to return to the detector via the fiber-optic circulator 42. A high speed tunable Fabry Perot (TFP) filter 60 (see K. Hsu, C. M. Miller, Y Bao, "Characterization of microsecond tuning speed in miniature fiber Fabry-Perot tunable filters," OFC'95 Technical Digest, p.18, 1995; and Coretek MEM-TUNE data sheet, Burlington, Mass.) can be used at the output to filter noise. Each wavelength of the tunable laser will correspond to a specific location along the radial direction of the CD. Hence, the system has an inherent property of position coding by exploiting wavelength diversity. The same optical beam scanning approach can also be used to access data from a moving tape 62, instead of a rotating optical disk 58. The optical beam scans in a direction transverse to the direction of tape motion, as shown in FIG. 3A.

Figure 3B:
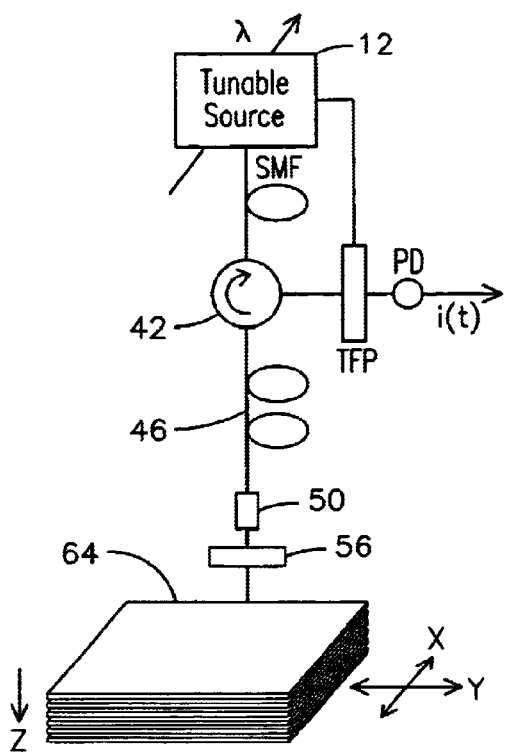
FIG. 3B shows a W-MOS based multi disk platform for 3D data storage and retrieval, and (c)
Figure 3C:
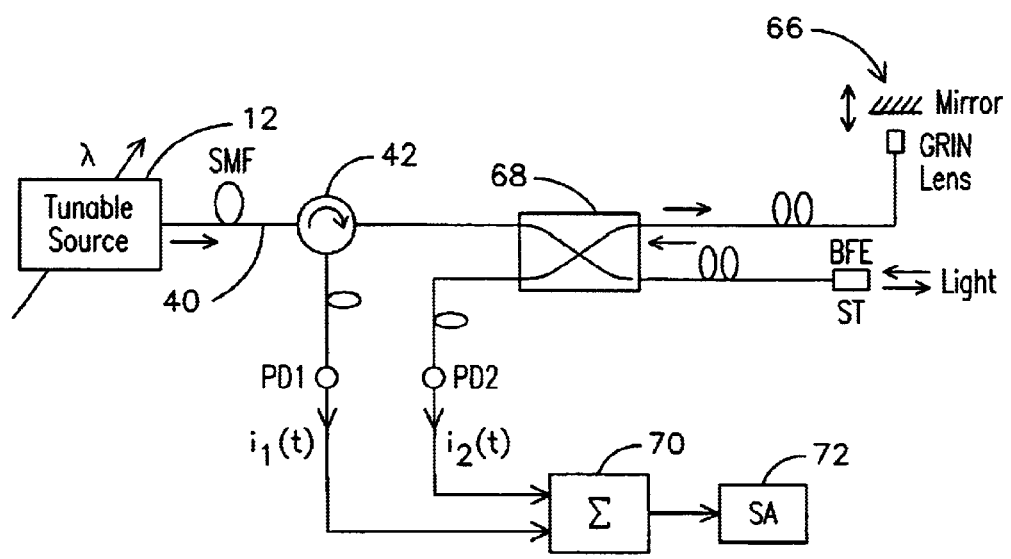
FIG. 3C shows how a W-MOS based can be made into a high speed scanning optically interferometric or coherent sensor via the use of a fiber 2×2 coupler-based michelson interferometer. The reference mirror can be adjusted to optimize time delays or sensor modulation depth. G: Grating; FR: Faraday Rotator; PD: Photodetector; SMF: Single Mode Fiber; L: Spherical Lens; OD: Optical Disk; TFP: Tunable Fabry Perot Filter; SA: Spectrum Analyzer.

Another 3D data storage and retrieval system based on wavelength multiplexing is shown in FIG. 3B. This optical scanner design does not need a wavelength dispersive element and terminates in a beam collimating GRIN lens. A multi-disk platform 64 is composed of interference films designed for reflection of different optical wavelengths. These films are similar in process to the films in the interference film-based wavelength division multiplexers used in the telecommunication industry. The first layer is designed to reflect $\lambda_1$ only, the second layer reflects $\lambda_2$ only, and so on. Thus by tuning the laser source 12, one can access different layers along the optical axis at a very high speed. The multi-disk platform 64 is mounted on a 2D mechanical translational stage. Thus, by moving the platform in 2D and varying the wavelength of the source, different locations of the 3D data storage device can be accessed at much higher speeds compared to the present day mechanical systems for data storage and retrieval. The scanning systems in FIGS. 3A and 3B when used in a transmit mode can be used for high speed precision data writing using high optical power intensity modulated tunable sources. FIG. 3C shows how a W-MOS such as in FIG. 3B can be made into a high speed scanning optically interferometric or coherent sensor 66 via the use of a fiber 2×2 coupler-based Michelson interferometer. The reference mirror can be adjusted to optimize time delays or sensor modulation depth. If a grating is used for the dispersive element, one generates 1-d scanning in x or y. If a dispersive lens is used, the 1-D scanning is in the optical axis or z-direction. Independent time delays for the reference arm for each color can be generated via the use of a dispersive element used before the reference mirror and independent parallel paths with different freespace/solid-optic or fiber paths. Another option is to use a single fiber with different spaced fiber Bragg gratings at different frequencies. A broad band 3-dB coupler 68 divides light entering any input into equal values at the respective outputs. Photodectors PD1 and PD2 convert light to electrical signals for processing by receiver 70 and spectrum analyzer 72.

Figure 4A:
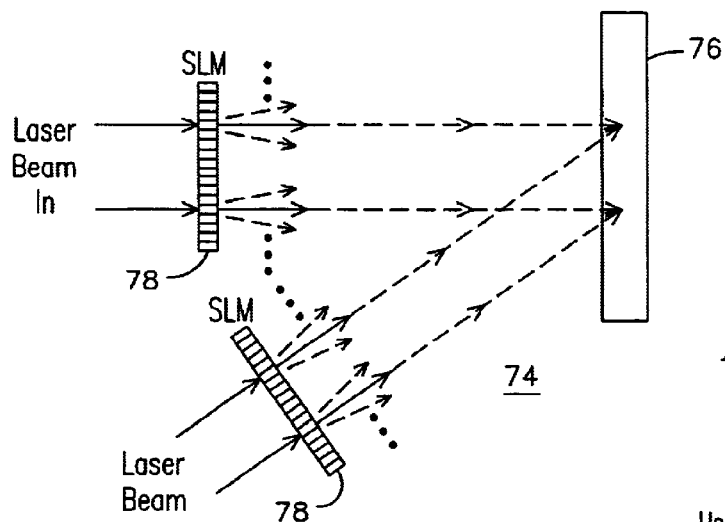
FIG. 4(a) shows a how the C-MOS is constructed using hologram recording.
Figure 4B:
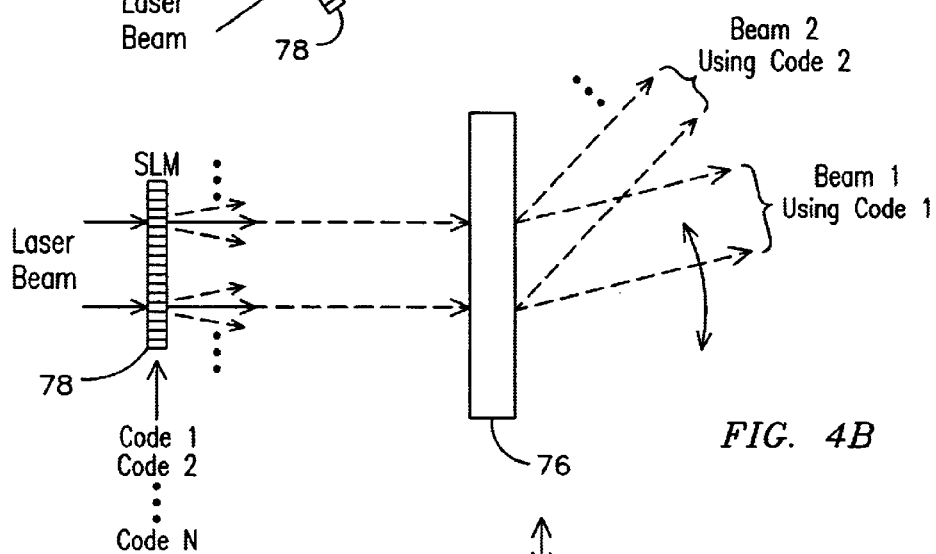
FIG. 4(b) shows a how the C-MOS scanner scans using holographic reconstruction of reference beams. The C-MOS principle is reverse to the principle so far been used for holographic storage of data where data pages are introduced by the SLM are later recovered by using the right reference beams.

FIG.4 introduces the concept of a spatial code division multiple access (CDMA) or C-MOS 74. In this case, a holographic material 76 is used to record scan beam generation holograms using an orthogonal set of spatial codes. When incident light with the right spatial code is incident on the hologram, its corresponding scan beam is generated. Fast spatial light modulators (SLMs) 78 can be used to generate (for hologram writing) and access (for hologram reading) the spatial codes using optical phase, amplitude, and polarization coding formats. Depending on the holographic storage material, this CDMA scanner can possess powerful properties such as wide angle scan beams, large number of beams, high resolution scanning, and large aperture scans.

As mentioned before, the approach to forming the C-MOS 74 is in reverse to the principles and needs of holographic image storage. The implementation of the C-MOS is reverse to holographic data storage as this time the signal beam is spatially coded with for example 1000 different orthogonal spatial codes, each code corresponding to a specific different reference beam. For example, the reference beam can be generated by a 2-axis mirror with 32 x-tilt positions and 32 y-tilt positions to realize 1024 far field points in space (x is horizontal and y is vertical directions in the scanner's cartesian coordinate scan space). Furthermore, more complex 3-D reference beams can be generated using another SLM in the reference beam path. Hence, when a particular 2-D code is input to the signal beam SLM, a particular reference beam is recovered that then acts as the scan beam in the far field for the scanner. This is in exact opposite to the holographic data storage process where a reference beam is generated to recover the data page. Note that the switching speed of the code generation SLM 78 controls the speed of the C-MOS. Hence, depending on the technology of the SLM, e.g., MEMS, NLCs, FLCs, magneto-optics (MO), acousto-optics (AO), multiple quantum wells (MQW), piezoceramics, etc, switching speeds can range from milliseconds to nanoseconds.

Figure 5:
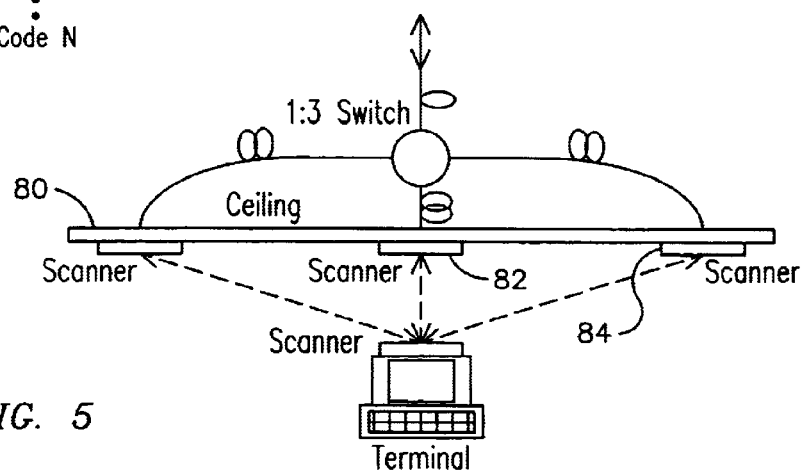
FIG. 5 shows a proposed concept of fault-tolerant agile beam indoor optical wireless using S-MOS and C-MOSs.

FIG. 5A shows how the S-MOS 10 and C-MOSs 30 can be used for an optical wireless application. As pointed out earlier, the present DBIR and DFIR methods used for indoor wireless suffer from limitations such as beam blocking catastrophic failure and high optical losses, respectively. An approach that can solve these problems is shown in FIG. 5A, and uses the concept of agile multiple beams using the S-MOS and C-MOS concepts. In other words, each transmitter has a built-in scanner, that provides two key functions. First, it provides robust and inertialess alignment with the receiving ports, such as on the ceiling of a room. Second, in case of physical blocking of the light beam in the freespace path or the ceiling, the light beam direction is rapidly reconfigured to generate a new directed beam to another known receiver port 80, 82 and 84. In addition, for greater robustness, N beams (e.g., N=3) instead of one can be simultaneously generated by the scanner to decrease the failure rate by N (e.g., or a third). A direct consequence of this method is better eye safety, better power consumption, better reliability, and higher bandwidths for the wireless links. Note that in general, the ports are transceivers, i.e., transmitters and receivers and form reversible transmit/ receive (T/R) optical links. Unlike light in an optical fiber, light propagating through freespace generally maintains its polarization. Furthermore, light beams can zigzag through each other without interference. These two properties of freespace light beams combined with wavelength diversity and agile beam pointing can be exploited to realize freespace optical switching and scanning structures to form a rapidly reconfigurable optical wireless node with enormous bandwidth potential. Although both indoor and outdoor scenarios can benefit from this architecture, the intersatellite node with large inter-node distances can benefit the most from this configuration.

The C-MOS requires some form of holographic storage material to store the desired holograms that generate the scan beams for the scanning operation. An excellent material choice is PTR glass. PTR glasses have shown a very high laser damage threshold of >10 $J/cm^2$ in the nanosecond regime, making them appropriate for high power military applications such as laser radar. In addition, these PTR glasses are transparent in the ultraviolet (UV), visible, and infrared (IR) regions, i.e., 0.28 to 4.3 microns, with a low few hundred $mJ/cm^2$ write beam energy levels making a highly photosensitive material. Holographic gratings with spatial frequencies as high as 10,000 lines/mm and diffraction efficiencies reaching 95% have been recorded in PTR glasses. Glasses can also be fabricated with large apertures at low costs. Hence our choice for using the PTR glass as a phase data storage medium for our MOSs. Other options for storage materials are photorefractive crystals such as lithium niobate, barium titanate, bismuth silicon oxide, to name a few.

What is claimed is:

1. A method for optically scanning in three dimensions comprising:

providing a source of controllable wavelength optical energy;

applying the optical energy to a line multiplexear for producing multiple outputs of optical energy at different wavelengths;

coupling each different optical wavelength to a corresponding different beam forming element, each different element scanning respective portion of a three dimensional volume; and detecting reflected optical energy from each portion of the three dimensional volume.

2. The method of claim 1, further comprising converting the reflected optical energy from an object in the three dimensional volume to an image of the object.

3. An optical beam scanner comprising:

a wavelength tunable optical source for producing an optical beam having a controlled variable wavelength;

an optical circulator coupled to the optical source for allowing transmission of optical beams and reception of reflected optical beams;

a first detector coupled to the optical circulator for detecting a reflected optical beam; and a frequency selective element for deflecting optical beams at a different angle for each incident wavelength.

4. The optical beam scanner of claim 3, further comprising:

a broadband optical source for generating a broadband optical beam; and a wavelength selective filter, coupled to the broadband optical source, for selectively filtering the broadband optical beam to produce an optical beam having a desired wavelength.

5. The optical beam scanner of claim 3, further comprising:

a reference mirror;

an optical coupler for coupling a portion of the optical beam to the mirror;

a second detector for detecting the portion of the optical beam reflected from the mirror; and a receiver for comparing the portion of the optical beam reflected from the mirror with the reflected optical beam.

6. A solid object imaging system comprising:

a wavelength tunable optical source for producing an optical beam having a controlled variable wavelength;

a line multiplexer coupled to the optical source for producing multiple outputs of optical energy at different wavelengths;

a plurality of beamforming elements for coupling each different optical wavelength to a corresponding different beam forming element, each different element imaging a different part of the solid object; and a detector for detecting reflected optical energy from each part of the object and converting the reflected energy to an image of the object.

7. The system of claim 6, wherein each beamforming element further comprises a scanning element for providing a scanned image of part of the object at each beamforming element.

8. The system of claim 7 wherein the scanning element is a 2-axis tilt mirror, a deformable mirror chip, or a liquid crystal beam steerer device.

9. The system of claim 6, further comprising a circulator, coupled to the optical source, for allowing transmission of the optical beam and reception of a reflected optical beam.

10. A method of generating a scanning optical beam comprising:

generating a broadband optical beam;

selectively filtering the broadband optical beam to produce an optical beam having a desired wavelength;

directing the optical beam through a frequency selective element that deflects the beam at a different angle for each incident wavelength;

varying the wavelength of the optical beam to effect scanning movement of the beam passing through the frequency selective element; and detecting a scanned reflected optical beam.

* * * * *